United States Patent [19]
Canady et al.

[11] Patent Number: 5,742,828
[45] Date of Patent: Apr. 21, 1998

[54] COMPILER AND METHOD FOR EVALUATION OF FOREIGN SYNTAX EXPRESSIONS IN SOURCE CODE

[75] Inventors: Dennis Mark Canady, Redmond; Alan Carter, Bellevue; Ilan Gabriel Caron, Redmond; Mark Leslie Roberts, Bellevue; David Gordon Bradlee; Steven E. Lees, both of Seattle, all of Wash.

[73] Assignee: Microsoft Corporation, Redmond, Wash.

[21] Appl. No.: 285,400

[22] Filed: Aug. 3, 1994

[51] Int. Cl.$^6$ .................................................. G06F 9/45
[52] U.S. Cl. ................................................... 395/708
[58] Field of Search .................................. 395/700, 701, 395/702, 705, 707, 708

[56] References Cited

U.S. PATENT DOCUMENTS 4,712,189  12/1987  Mohri ..................................... 395/700

OTHER PUBLICATIONS

Microsoft, "Microsoft Visual Basic Programming System for Windows Version 3.0, Professional Features Book 1," Microsoft Corporation, Redmond, MA, pp. xv–4, 1993.

Microsoft, "Microsoft Visual C++ Development System for Windows Version 1.0, Prgrammer's Guides, Class Library User's Guide," Microsoft Corporation, Redmond, WA, Ch. 17 — pp. 265–272, 1993.

Microsft, "Microsoft Visual C++ Development System for Windows Version 1.0, Class Library Reference," Microsoft Corporation, Redmond, WA, pp. 827–841, 1993.

Fielding, Justin, "Add visual power to 1-2-3/W; use Microsoft's Visual Basic to create custom dialog boxes for your worksheets," Lotus, v8, n4, p.52(6), Apr. 1992.

Zurek, Bob, "Extend your front end: how to keep your Windows front ends aligned with DLLs and DDE," DBMS, v6, n3, p. 20(3), Mar. 1993.

Zurek, Bob, "Front–end integration: merging existing spreadsheet capabilities with your development tool of choise," DBMS, v6, n11, p. 22(2), Oct. 1993.

Horwith, Michael, "Master PowerBuilder's OO features," Data Based Advisor, v11, n12, p.122(5), Dec. 1993.

*Introduction to Programming*, Microsoft Access, Relational Database Management System For Windows, pp. 62–67 (1992).

Webb, *OLE 2.0 Automation*, Technical Articles: Windows: OLE: Automation— MSDN Library, Jul. 1996.

Trupin, *Application Interoperability With Visual Basic For Applications And OLE 2.0*, Microsoft Systems Journal, vol. 9, No. 2, Feb., 1994.

Nilsen, *Using The OLE Automation Interface With Visual Basic*, Tech*Ed Conference, Mar. 1994.

Marsh, *Shifting Gears From VBX To OCX*, Visual Basis Programmer's Journal, Jun./Jul. 1994.

IBM SC26–4358–3, Systems Application Architecture, "Common Programming Interface Procedures Language Reference", Fourth Edition (Sep. 1990), pp. iii–29.

Microsoft Visual Basic, Programming System for Windows, Version 3.0, Document No. DB55959–1093, 1993, pp. 135–136.

*Primary Examiner*—James P. Trammell
*Assistant Examiner*—Peter J. Corcoran, III
*Attorney, Agent, or Firm*—Klarquist Sparkman Campbell Leigh & Whinston, LLP

[57] ABSTRACT

Source code including application defined expressions and non-conforming identifiers are compiled to executable code. The source code is written with an application defined expression or non-conforming identifier enclosed between a predefined pair of matching separators, such as square brackets. When a sequence of characters between the predefined separators is encountered in the source code during compiling, a symbol table is searched for a matching identifier. If found, the characters are interpreted as a non-conforming identifier and bound to the matching identifier. If not found, the characters are interpreted as an application defined expression and bound to a function call for an evaluating function provided in an application library.

20 Claims, 3 Drawing Sheets

COMPILER AND METHOD FOR EVALUATION OF FOREIGN SYNTAX EXPRESSIONS IN SOURCE CODE

FIELD OF THE INVENTION

The invention relates to compiling computer programs written in a high level programming language into executable form, and, more particularly, relates to evaluating foreign expressions (i.e., not conforming to a syntax of the high level language) within a program.

BACKGROUND OF THE INVENTION

Computers operate under the control of a program consisting of coded instructions. Typically, programs are first written in a high level language, such as BASIC, PASCAL, C, C++, or the like, which are more readily understood by humans. A file containing a program in its high level language form is known as source code. The high level language statements of the source code are then translated or compiled into the coded instructions executable by the computer. Typically, a software program known as a compiler is used for this purpose. The compiled form of a program is generally known as object code.

High level languages generally have a precise syntax which defines certain permitted structures for statements in the language and their meaning. Since only statements whose structure conforms to the syntax have defined meanings, a statement which varies from the syntax cannot be properly compiled. Such syntax non-conforming statements are generally ambiguous, or non-sensical. Accordingly, when such statements are encountered in source code, compilers have typically generated error messages without translating the non-conforming statement.

The syntax of high level programming languages also defines the particular sequences of characters permitted to be used as identifiers that name variables, procedures, objects, and other program elements. Identifiers in a source code file which do not conform to the syntax are not recognized by the compiler. Compiling source code including such non-conforming identifiers generally results in an appropriate error message.

Microsoft Visual Basic® version 2.0 and Microsoft Access® version 1.0 included compilers which permit the use of syntax non-conforming identifiers. To use a non-conforming identifier (such as a reserved word, or character sequence including spaces), the programmer brackets the identifier with matching square brackets. The compiler interprets such bracket-enclosed identifiers as non-conforming identifiers. Such non-conforming identifiers are stored in a symbol table of the compiler, and are bound to the variable, procedure, or other construct to which they refer as if conforming to the proper syntax.

One broad category of computer programs are application programs. Applications, as opposed to operating system programs, are devoted to a particular use of the computer, such as for manipulating financial data in spreadsheets, writing documents, drawing graphics, communicating via a modem, and many others. Microsoft's Excel, Access®, and Word software products are examples of application programs.

Application programs typically respond to commands entered by a user through use of a keyboard or mouse. Some applications also respond to commands in a user composed file (sometimes referred to as a macro). These commands are required to conform to a particular syntax specific to the application which defines acceptable structures for commands. For example, according to a syntax used by Microsoft's Excel software, a range of cells in a spreadsheet is specified in a command by a sequence of an identifier for the top left cell in the range, a colon, and an identifier for the bottom right cell (e.g. "A1:B8" for the range of spreadsheet cells from a cell at column A, row 1 to a cell at column B, row 8).

Language systems, such as Microsoft's Visual Basic® version 2, can be used to develop programs which control or integrate with commercial application software. For example, a software developer can write and compile a custom application program which controls or integrates with the Microsoft Excel software using the Visual Basic® language. Such custom applications are written in a particular high level programming language, e.g. Visual Basic®, and must conform to its syntax. However, expressions written in the command syntax of a controlled application, e.g. Excel, generally do not conform to the high level programming language syntax. Thus, such command syntax conforming expressions cannot be used in the custom programs developed with previous compilers.

SUMMARY OF THE INVENTION

When writing source code for a custom program to control or integrate with an application program, it is sometimes desirable to use expressions (an "application defined expression") in a syntax specific to the application, such as the application's command syntax, to refer to objects made available by the application. Such application defined expressions do not necessarily conform to a syntax of the high level programming language in which the source code is written. The present invention provides a compiler and method for compiling source code including such application defined expressions.

According to the invention, a high level programming language compiler interprets an expression enclosed between a particular pair of matching separators (square brackets in a preferred embodiment) as an application defined expression. An application makes available to the language compiler a library associated with that application. The library defines objects that have an evaluating method for evaluating expressions conforming to a command syntax of the object. In addition, the library can include a global evaluating function that is used to evaluate expressions conforming to the application's command syntax. The compiler translates the separator-enclosed expression as a call to the evaluating method or function with the expression as a parameter.

The compiler and method of the present invention provides a general and extensible solution to the problem of compiling source code which includes application defined expressions. Specifically, according to the present invention, multiple different evaluators can be provided to a compiler for evaluating expressions defined by various applications, and application objects. In addition, evaluators can be made available to the language compiler at a later time. For example, vendors of application software programs can provide a type library containing application specific evaluators for any application software.

According to a further aspect of the invention, the compiler also supports the use of non-conforming identifiers. When the compiler encounters a character sequence enclosed by a particular pair of matching separators, the sequence may be an application defined expression or a non-conforming identifier. The compiler first searches its symbol table for an entry that matches the sequence. If the enclosed character sequence matches an entry in the symbol table, it is interpreted as an identifier. Otherwise, the compiler treats the enclosed character sequence as an application defined expression.

Additional features and advantages of the invention will be made apparent from the following detailed description of a preferred embodiment which proceeds with reference to the accompanying drawings.

DETAILED DESCRIPTION OF THE PREFERRED EMBODIMENTS

Figure 1:
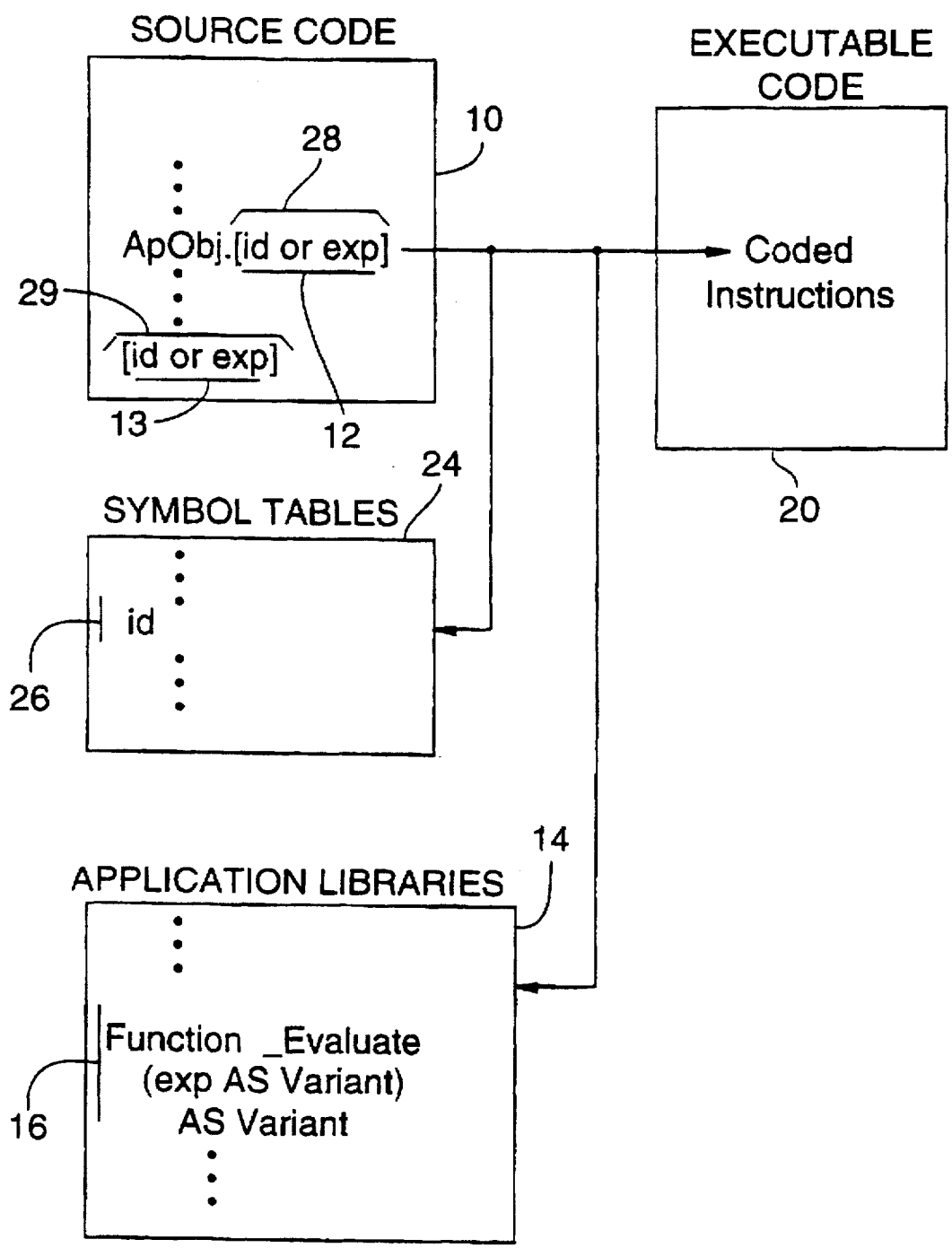
FIG. 1 is a block diagram of a source code file including a syntax non-conforming identifier or an application defined expression being compiled into executable code according to the invention.

With reference to FIG. 1, a program for a computer is written as one or more source code files 10 in a high level language. In the preferred embodiment of the invention, the source code files 10 are written in the Visual Basic® language. According to the invention, the source code 10 may contain one or more non-conforming identifiers and application defined expressions 12–13.

According to the syntax of the high level language used in the preferred embodiment of the invention, identifiers (which name procedures, variables, and constants, and other program elements) must observe the following four rules: (1) begin with a letter, (2) contain only letters, numbers, and the underscore character, (3) be no longer than 255 characters, and (4) cannot be reserved words. Identifiers which violate any of these rules are herein referred to as non-conforming identifiers. For example, the strings, "sub" (a reserved word), "4get" (begins with a number), and "get area" (contains a space character), when used as identifiers are considered to be non-conforming.

The high level language of the preferred embodiment is designed for use in writing custom programs that integrate into or control various commercially available application programs, such as Microsoft Excel, Access®, and Word, so as to customize these applications. Integration with and control of application programs is accomplished, in part, by providing a library 14 ("application library") for each application containing data structure definitions and procedures used for interacting with the application. Application libraries, for example, may be provided by an application software vendor along with a purchased application program to allow users to write their own custom programs for integrating with or controlling the application program. Preferably, the application library 14 contains code defining various application objects (a collection of data items and associated procedures for manipulating the data items) for interacting with the application. For example, an application library for spreadsheet applications, such as the Microsoft Excel software, may include application objects for workbooks, spreadsheets, ranges of cells, and charts. An application library for a word processor application, such as the Microsoft Word software, may include application objects for documents, footnotes, headers, and paragraphs.

Some application programs can be programmed by a user with application specific commands.

The structure of commands to which an application responds is defined by a command syntax (sometimes referred to as a macro language syntax) specific to the application. An application's command syntax typically includes convenient notations for various data structures maintained by the application. Expressions using notations defined by an application syntax are herein referred to as application defined expressions. An example of such an expression is the notation for specifying a range of spreadsheet cells in the Microsoft Excel application program. Specifically, a range is specified by the column letter and row number of the top left and bottom right cells of the range separated by a colon (e.g. A1:B8 for the range of cells from column A, row 1 to column B, row 8).

According to the invention, the application library 14 further includes an evaluating function or method 16 for evaluating the identifier or expression 12 as an application defined expression according to a command syntax of the application. In the preferred embodiment, an evaluating method can be included in the definition of an application object in the application library 14. (The term "method" is used herein to refer to a function which is associated with an application object.) Such an evaluating method consists of code for evaluating expressions conforming to the application object's command syntax. An application library can include definitions for plural application objects, each having its own evaluating method. A global evaluating function also can be included in an application library, which consists of code for evaluating expressions conforming to the application's command syntax. In the preferred embodiment, the evaluating function or method 16 is in the following form:

VARIANT_Evaluate (VARIANT name);     (1)

(shown for purposes of illustration in C programming language syntax) which accepts a VARIANT type parameter containing a string.

In accordance with the invention, a programmer, in writing the source code 10, encloses application defined expressions and non-conforming identifiers within a predefined pair of matching separators. (As used herein, separators are characters used to separate lexical and/or syntax constructs in a high level programming language.) The definition of which particular separators are used for this purpose becomes part of the high level programming language syntax. Preferably, the separators are matching square brackets, i.e. []. Although, in alternative embodiments of the invention, other characters can be used as the predefined pair of matching separators. In further alternative embodiments each separator can be a sequence of more than one character.

For example, in the source code 10, a programmer may use a non-conforming identifier as an identifier naming a property of an application object, as follows:

AppObj.[background color]     (2)

where "AppObj" is an identifier for an instance of the application object, and "background color" is a non-conforming identifier for a property (i.e., a data element, data structure, or, procedure associated with the application object) of the application object. The string, "background color," is a non-conforming identifier in the syntax of the high level language used in the preferred embodiment because it contains a space character.

In the source code 10, a programmer also may use an application defined expression as a convenient notation to specify data available through an application. For example, if "My_Sheet" is an identifier for an instance of a spreadsheet-type application object defined in the application library of the Microsoft Excel application, the application defined expression "A1:B8" can be used to specify a range of cells in the spreadsheet object by the following line of source code:

$$\text{My\_Sheet. [A1:B8]} \qquad (3)$$

Referring still to FIG. 1, the source code 10, which potentially contains one or more non-conforming identifiers or application defined expressions enclosed in square brackets, is compiled according to the invention into executable code 20. The source code 10 is compiled into executable code utilizing compiling processes that are known in the art (and therefore not explained in detail herein), such as by the various steps of lexical analysis, syntax analysis, code generation, and code optimization, and additionally including the steps of a method 30 illustrated in FIG. 2. Preferably, the compiling process is performed by a software program known as a compiler (not shown).

As a part of the compiling process, the source code 10 is separated into various lexical and syntax structures according to its programming language. Specifically, the characters of the source code 10 are grouped into various lexical constructs (generally referred to as "tokens") such as keywords, operator symbols, punctuation, identifiers, and the like. These lexical constructs are then grouped into syntax structures of the programming language, such as declarations, expressions, operative statements, and the like.

Also as a part of this compiling process, the compiler generates one or more symbol tables 24 which contains entries for names (herein referred to as "identifiers") of variables, constants, procedures, and other program elements. The compiler generates the symbol tables 24 in a conventional manner by reading declaration statements in the source code 10. These declaration statements assign a name and attributes to various elements of the program, such as variables, constants, procedures, and etc. For example, the following declaration statement in the programming language of the preferred embodiment assigns an identifier "length" and attributes of an integer to a variable:

$$\text{DIM length AS INTEGER} \qquad (4)$$

As the compiler reads such declaration statements in the source code 10, it stores data in entries of the symbol tables 24 indicating the name and attributes of the declared program elements. Program elements which have been assigned non-conforming identifiers preferably have their identifier stored in the symbol tables 24 as a string of characters. In the preferred embodiment of the invention, separate symbol tables are generated for identifiers available globally (referred to herein as a global symbol table), and for identifiers available within each object declared in the source code 10. Separate symbol tables associated with the application library and with each application object it defines also are generated in the preferred embodiment.

As yet another part of the compiling process, the compiler performs a process generally referred to as "binding" identifiers. In the source code 10, program elements which are assigned identifiers as names in declarative statements, are later referred to in operative statements by their assigned identifiers. For example, statements in the source code 10 which perform operations on a variable refer to the variable by its assigned identifier. In the binding process, the compiler determines which program element is being referenced by identifiers in these operative statements such as by searching for a matching identifier in the symbol tables 24. After determining which program element is being referenced by an identifier in an operative statement, the compiler generates coded instructions in the executable code 20 corresponding to the operative statements in which the identifier is replaced with a reference to storage locations allocated in the executable code for the referenced program element.

Figure 2:
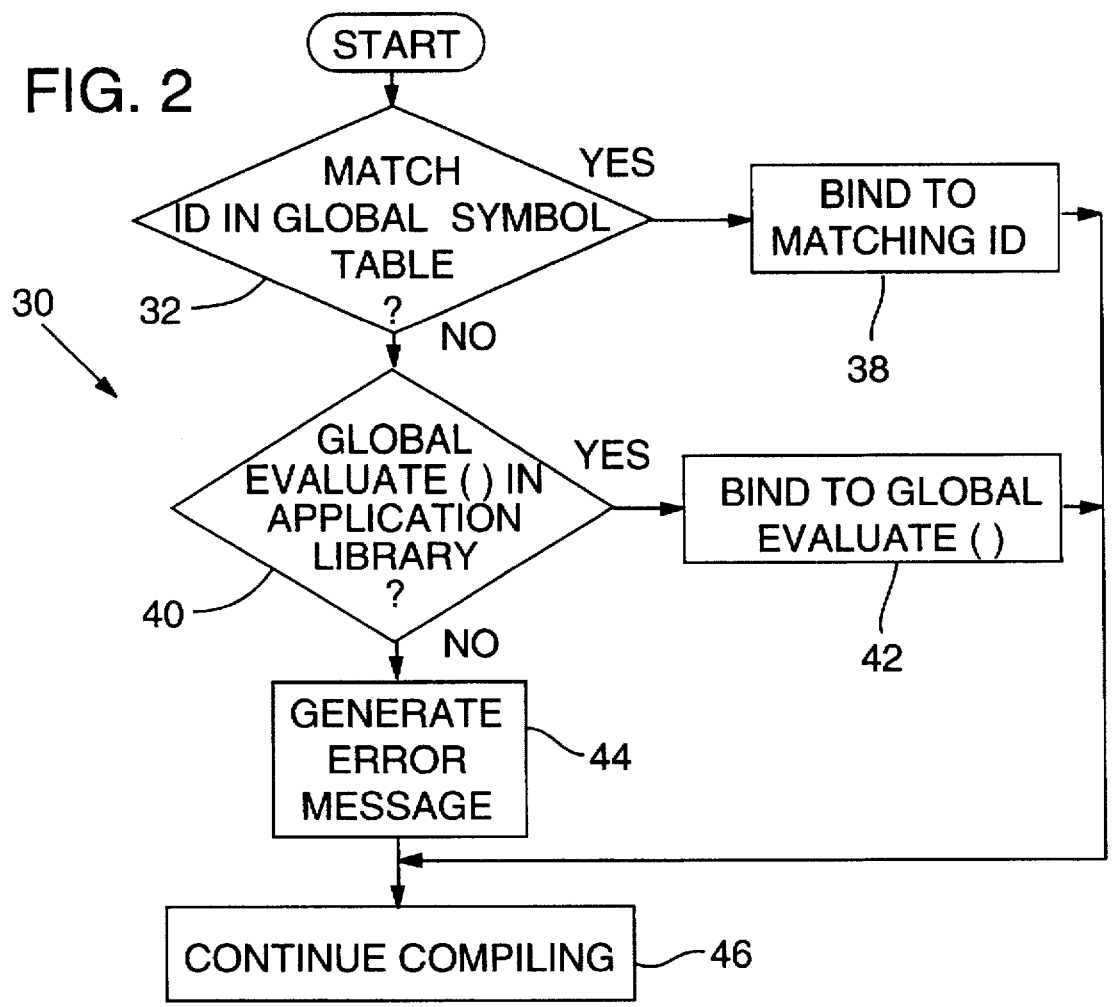
FIG. 2 is a flow diagram of a method for compiling an unqualified, separator-enclosed identifier or expression in the source code file of FIG. 1 according to a preferred embodiment of the present invention.
Figure 3:
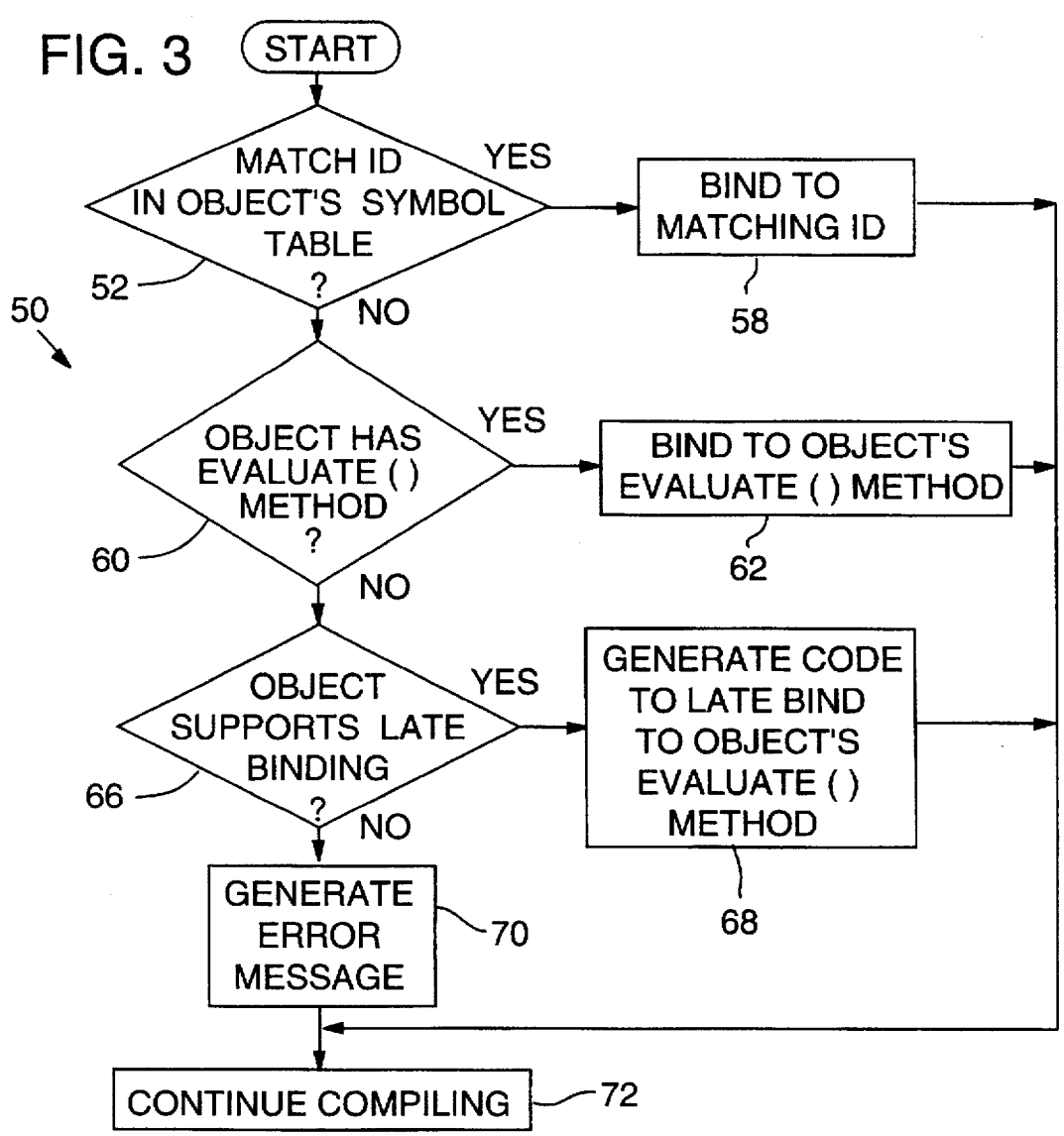
FIG. 3 is a flow diagram of a method for compiling a qualified, separator-enclosed identifier or expression in the source code of FIG. 1 according to a preferred embodiment of the present invention.
Figure 4:
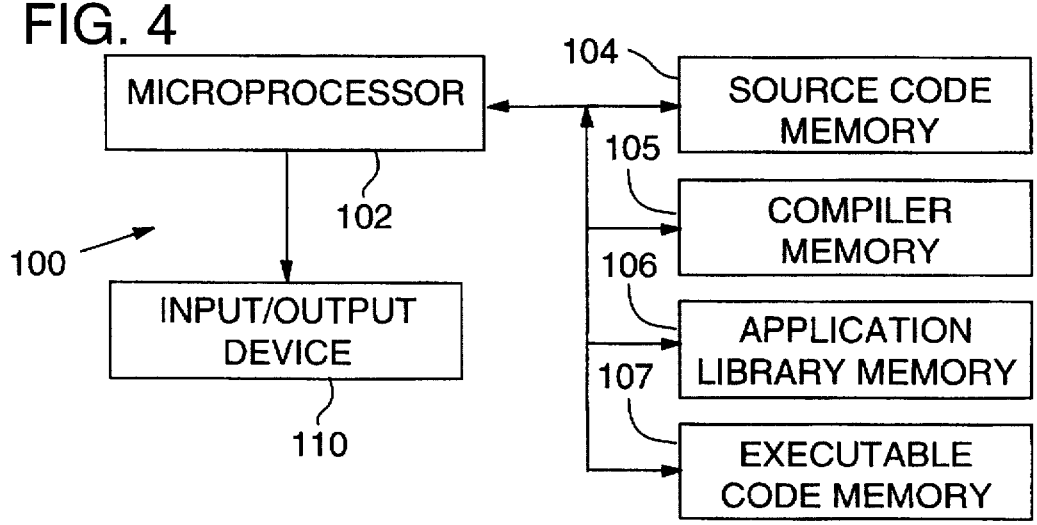
FIG. 4 is a block diagram of an apparatus for carrying out the method of FIG. 2.

With reference to FIGS. 2 and 3, when the compiler identifies a syntax structure 28–29 comprising a sequence of characters enclosed by square brackets, such as the non-conforming identifier or application defined expression (hereafter referred to as "bracket contents") 12–13, the compiler binds the bracket contents by performing the methods 30 (FIG. 2) and 50 (FIG. 3). In the source code 10, the bracket contents 12–3 can be in either a qualified syntax structure 28 or an unqualified syntax structure 29. The qualified syntax structure 28 is preceded by one or more identifiers separated by periods, such as in the source code lines of examples (2) and (3) above. The prefixed identifiers name a "qualifying" object and indicate that the bracket contents 12 of the qualified syntax structure 28 are to be interpreted with respect to that object. For example, in the source code line of example (2) above, the bracket contents are to be interpreted with respect to the object named by the identifier "AppObj." In the unqualified case, the unqualified syntax structure 29 does not include any prefixed identifiers for a qualifying object. This indicates that the bracket contents 13 of the unqualified syntax structure 29 are to be interpreted globally, i.e without reference to a specific object.

With reference to FIGS. 1 and 2, in the case of the unqualified syntax structure 29, the compiler performs the method 30. In a first step 32 of the method 30, the compiler searches its global symbol tables for an identifier that matches the bracket contents 13 of the unqualified syntax structure 29. If a matching identifier is found in the global symbol tables 24, the bracket contents 13 are considered to be an identifier (whether or not conforming to the programming language's syntax). The compiler then binds the syntax structure 29 to the matching identifier in the symbol tables 24. For example, for an unqualified syntax structure, "[Default Font]," the compiler searches its global symbol tables 24. If the global symbol tables contain an identifier "Default Font" naming a function in the application library 14, the compiler binds the [Default Font] syntax structure to that function. However, if no match to the bracket contents 13 is found in the global symbol tables 24, the bracket contents 13 are considered to be an application-defined expression and the compiler proceeds to step 40.

In step 40, the compiler searches the symbol tables associated with the application libraries made available to it for a global evaluating function (e.g. evaluating function or method 16), having the form described above. If such a global evaluating function 16 is found, the compiler binds the structure 29 to the global evaluating function 16 at step 42. In binding to the global evaluating function 16, the compiler generates coded instructions in the executable code 20 for invoking the global evaluating function using the bracket contents 13 (in string format) as a parameter to the function. In effect, the compiler generates coded instructions for the syntax structure 29 as if it were in the following form in the source code 10:

_Evaluate ("id or exp")          (5)

Accordingly, at run-time (i.e. during execution of the executable code 20), the global evaluating function 16 provided by the application library 14 is called by the program to evaluate the bracket contents 13 as an application defined expression. If no global evaluating function is provided by the application libraries 14, then the compiler generates an error message at step 44.

At step 46, after completing the above steps of the method 30, the compiler continues the process of compiling the source code 10. In the continued compiling, the compiler repeats the method 30 for each additional unqualified syntax structure containing a non-conforming identifier or application defined expression in the source code 10.

With reference to FIGS. 1 and 3, in the case of the qualified syntax structure 28, the compiler performs the method 50. In a first step 52 of the method 50, the compiler searches the symbol table associated with the qualifying object in the symbol tables 24 for an identifier that matches the bracket contents 12. If the bracket contents 12 match an identifier in that symbol table, the bracket contents are considered to be an identifier. Accordingly, the compiler binds the syntax structure 28 to that identifier. For example, with the qualified syntax structure, "AppObj.[Background color]," the compiler searches the symbol table associated with the object named by the identifier "AppObj" for a program element with the name "Background color." If a program element of the "AppObj" object has been assigned the identifier "Background color" as a name, the symbol table associated with the object will contain such an identifier. The compiler then will bind the "AppObj.[Background color]" structure to that identifier. However, if no match is found in qualifying object's symbol table, the bracket contents 12 are considered to be an application defined expression. The compiler then proceeds to step 60.

At the step 60, the compiler searches the symbol table associated with the qualifying object in the symbol tables 24 for an evaluating method having the form described above. If the application library 14 defines an evaluating method for the qualifying object, the compiler will have generated an entry in the qualifying object's symbol table for that evaluating method. If the evaluating method is defined for the qualifying object, the compiler binds the qualified syntax structure 28 to the evaluating method at step 62. In the step 62, the compiler generates coded instructions in the executable code 20 for invoking the qualifying object's evaluating method using the bracket contents 12 (in string format) as a parameter to the method. In effect, the compiler generates coded instructions for the syntax structure 28 as if it were written in the following form in the source code 10:

ApObj._Evaluate ("id or exp")          (6)

When the executable code of the program is later executed (i.e. at run-time), these coded instructions call the evaluating method to evaluate the bracket contents 12 as an application defined expression.

If the compiler is unable to locate an evaluating method in the symbol table of the qualifying object at step 60, the compiler proceeds to step 66. One circumstance in which an evaluating method is not available for a qualifying object is where the qualifying object is untyped at compile time. For example, an object may be declared as untyped, and its type later assigned at run time depending on program execution as in the following lines of source code (shown in Visual Basic® programming language syntax):

DIM anObject AS Object          (7)

DIM aSpreadsheetObject AS Spreadsheet
SET anObject=aSpreadsheetObject
IF condition=1 THEN
    anObject.[a1]=100

In this example, the type of the qualifying object of the syntax structure on the last line is not known until the previous line is executed at run-time.

When the qualifying object of the syntax structure 28 is untyped, the structure cannot be bound to an evaluating method of the object during compile time. In the preferred embodiment of the invention, the compiler may dynamically bind the structure to an evaluating method at run time when the object's type is known (dynamic, run-time binding is referred to herein as "late binding"). At step 66, the compiler determines whether the qualifying object supports late binding. If the qualifying object supports late binding to its methods, the compiler proceeds to step 68 where it generates code to invoke the qualifying object's evaluating method at run-time. If, however, the qualifying object does not support late binding, the compiler generates an error message at step 70.

After completing the method 50, the compiler resumes compiling the source code 10 at the next program structure following the syntax structure 28. If a further syntax structure containing a bracketed non-conforming identifier or application defined expression is encountered in the source code 10, the compiler again performs the method 30 if the syntax structure is unqualified or the method 50 if the syntax structure is qualified.

With reference to FIG. 3, hardware 100 for carrying out the invention preferably comprises a microprocessor 102, such as the intel 80X86 family of microprocessors, which is controlled by a software program to perform the method of the invention. The hardware 100 also comprises memory 104–107 for storing data used by the invention, including a source code memory 104 for storing the source code 10, a memory 105 for storing the compiler, a memory 106 for storing the application libraries 14, and a memory 107 for storing data generated by the compiler, such as the executable code 20 and the symbol tables 24. (For purposes of illustration, the data has been shown as being stored in four separate memories. It is to be understood, however, that the data used in the invention may appear in any number or combination of files stored in any number and types of storage.) Memory for other data required by the invention may be provided as needed. The memories 104–107 may include various types of storage, such as semiconductor chip memory (e.g. DRAM), magnetic storage media devices (e.g. floppy or hard disk devices), and the like. An input/output device 110 accepting user input and for providing a user understandable output also is provided. The input/output device 110 may comprise, for example, a keyboard, a mouse pointing device, and the like for user input, as well as a CRT or LCD screen, a printer, or the like for displaying information to the user.

Having described and illustrated the principles of our invention with reference to a preferred embodiment, it will be recognized that the preferred embodiment can be modified in arrangement and detail without departing from such principles. For example, the invention may be applied to both high level languages which are compiled and those which are interpreted. For expository convenience, the term "compiler" has been used herein to refer to both compilers and interpreters.

In view of the many possible embodiments to which the principles of our invention may be put, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method for compiling source code containing one or more application defined expressions, the source code conforming to a first syntax of a high level programming language and the application defined expressions conforming to a second syntax associated with an application program, the method comprising:

providing a library associated with the application program, the library defining an evaluator for evaluating expressions according to the second syntax;

compiling the source code according to the first syntax into object code for executing on a computer;

interpreting a syntax structure in the source code consisting of a character string enclosed between a predefined pair of separators as an application defined expression; and converting said syntax structure to coded instructions in the object code of a function call for invoking the evaluator with the character string as a parameter whereby the evaluator is invoked to evaluate the character string according to the second syntax on execution of the object code.

2. The method according to claim 1 wherein the separators designate that the character string is non-compliant to the first syntax, and further comprising:

generating a symbol table comprising a plurality of entries containing names of identifiers defined in the source code;

searching the symbol table for an entry containing a name of an identifier matching the character string; and if a matching name is found in the symbol table, binding the syntax structure to the identifier.

3. The method of claim 1 wherein the library defines a plurality of application objects which have associated data and procedure members, and wherein the evaluator is a global evaluating function for evaluating expressions relating to any of the application objects.

4. The method of claim 1 wherein the library defines a plurality of application objects which have associated data and procedure members, and the evaluator is an evaluating method associated with a particular one of the objects for evaluating expressions specific to the particular application object.

5. A computer readable storage medium having computer-executable instructions for performing the steps recited in claim 1.

6. A method for compiling source code containing one or more application defined expressions, the source code conforming to a first syntax of a high level programming language and the application defined expressions conforming to a second syntax associated with an application program, the method comprising:

analyzing the source code to identify a syntax structure in the source code consisting of a character string enclosed between a predefined pair of separators;

searching an application library for an evaluator having a reserved, non-programmatically determined name, the evaluator containing code for evaluating application defined expressions according to the second syntax; and if the application library includes the evaluator, binding said syntax structure to a function call for invoking the evaluator with the character string as a parameter.

7. The method according to claim 6 comprising:

if no evaluator having said reserved name is found in the application library, late binding the structure to a function call for invoking an evaluator with the character string as a parameter.

8. The method according to claim 6 comprising, when the syntax structure is unqualified:

searching the application library for the evaluator, the evaluator being a global evaluating function; and if the application library defines the global evaluating function, binding the syntax structure to a function call for invoking the evaluating method with the character string as a parameter.

9. A computer readable storage medium having computer-executable instructions for performing the steps recited in claim 8.

10. The method according to claim 6 wherein the separators designate that the character string is non-compliant to the first syntax, and comprising, prior to the step of searching an application library, the additional steps of:

generating a symbol table comprising a plurality of entries containing names of identifiers defined in the source code;

searching the symbol table for an entry containing a name of an identifier matching the character string; and if a matching name is found in the symbol table, binding the syntax structure to the identifier.

11. A computer readable storage medium having computer-executable instructions for performing the steps recite in claim 6.

12. A method for compiling source code containing one or more application defined expressions, the source code conforming to a first syntax of a high level programming language and the application defined expressions conforming to a second syntax associated with an application program, the method comprising:

analyzing the source code to identify a syntax structure in the source code consisting of a qualifying reference, and a character string enclosed between a predefined pair of separators, the qualifying reference indicating a qualifying object having data and method members;

searching an application library for an evaluator having a reserved name, the library defining a plurality of application objects which have associated data and procedure members, the evaluator being an evaluating method associated with the qualifying object and containing code for evaluating application defined expressions according to the second syntax; and if the application library defines the evaluating method, binding said syntax structure to a function call for invoking the evaluating method with the character string as a parameter.

13. The method according to claim 12 wherein the library defines a plurality of application objects which have associated data and procedure members, and comprising, if no evaluating method associated with the qualifying object is defined in the application library:

determining whether the qualifying object supports late binding; and late binding the syntax structure to a function call for invoking an evaluating method associated with the qualifying object with the character string as a parameter.

14. A computer readable storage medium having computer-executable instructions for performing the steps recited in claim 12.

15. An apparatus for compiling source code written in a high level programming language having a first syntax, the source code comprising one or more application defined expressions conforming to a second syntax other than the first syntax, the apparatus comprising:

an application library having code defining an evaluator for evaluating application defined expressions;

a memory for storing the source code;

a syntax analyzer operative to identify a syntax structure in the source code consisting of a character string enclosed within a predefined pair of separators; and a code generator operative, in response to the identification of said syntax structure by the syntax analyzer, to generate executable code corresponding to said syntax structure for invoking the evaluator with the character string as a parameter.

16. The apparatus of claim 15 wherein:

the application library defines a global evaluating function;

the syntax analyzer being operative to determine that said syntax structure is unqualified; and the code generator being operative, in response to the determination of said syntax structure as unqualified, to generate executable code corresponding to said syntax structure for invoking the global evaluating function.

17. An apparatus for compiling source code written in a high level programming language having a first syntax, the source code comprising one or more application defined expressions conforming to a second syntax other than the first syntax, the apparatus comprising:

an application library having code defining an evaluating method associated with an application object for evaluating application defined expressions;

a memory for storing the source code;

a syntax analyzer being operative to identify a syntax structure in the source code consisting of a qualifying identifier of the application object and a character string enclosed within a predefined pair of separators; and a code generator being operative, in response to the identification of said syntax structure by the syntax analyzer, to generate executable code corresponding to said syntax structure for invoking the evaluating method with the character string as a parameter.

18. An apparatus for compiling source code written in a high level programming language having a first syntax, and containing one or more application defined expressions conforming to a second syntax other than the first syntax, the apparatus comprising:

a memory for storing an application library defining an evaluator for evaluating application defined expressions, and for storing the source code; and a processor connected to the memory for compiling the source code into a corresponding executable code, the processor being operative to identify a syntax structure in the source code consisting of a character string enclosed between a predefined pair of separators, and to bind said syntax structure to the evaluator with the character string as a parameter.

19. The apparatus of claim 14 wherein the evaluator in the application library is a global evaluating function, the processor being operative to determine that said syntax structure is unqualified, and to bind said syntax structure to the global evaluating function with the character string as a parameter responsive to the determination.

20. An apparatus for compiling source code written in a high level programming language having a first syntax, and containing one or more application defined expressions conforming to a second syntax other than the first syntax, the apparatus comprising:

a memory for storing the source code and an application library defining an evaluator for evaluating application defined expressions, the evaluator being an evaluating method of an application object; and a processor connected to the memory for compiling the source code into a corresponding executable code, the processor being operative to identify a syntax structure in the source code consisting of a character string enclosed between a predefined pair of separators and qualified by a reference to the application object, the processor further being operative to bind said syntax structure to the evaluating method with the character string as a parameter.

* * * * *